UNITED STATES PATENT OFFICE.

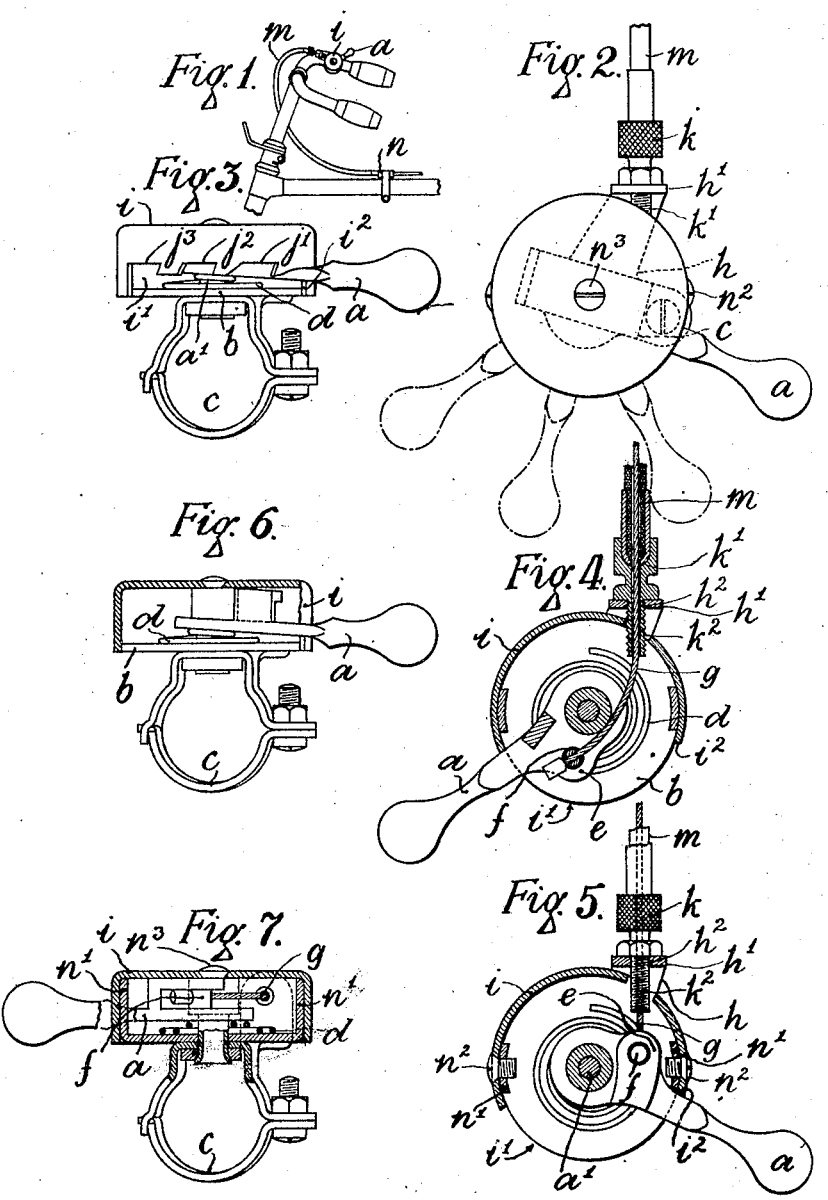

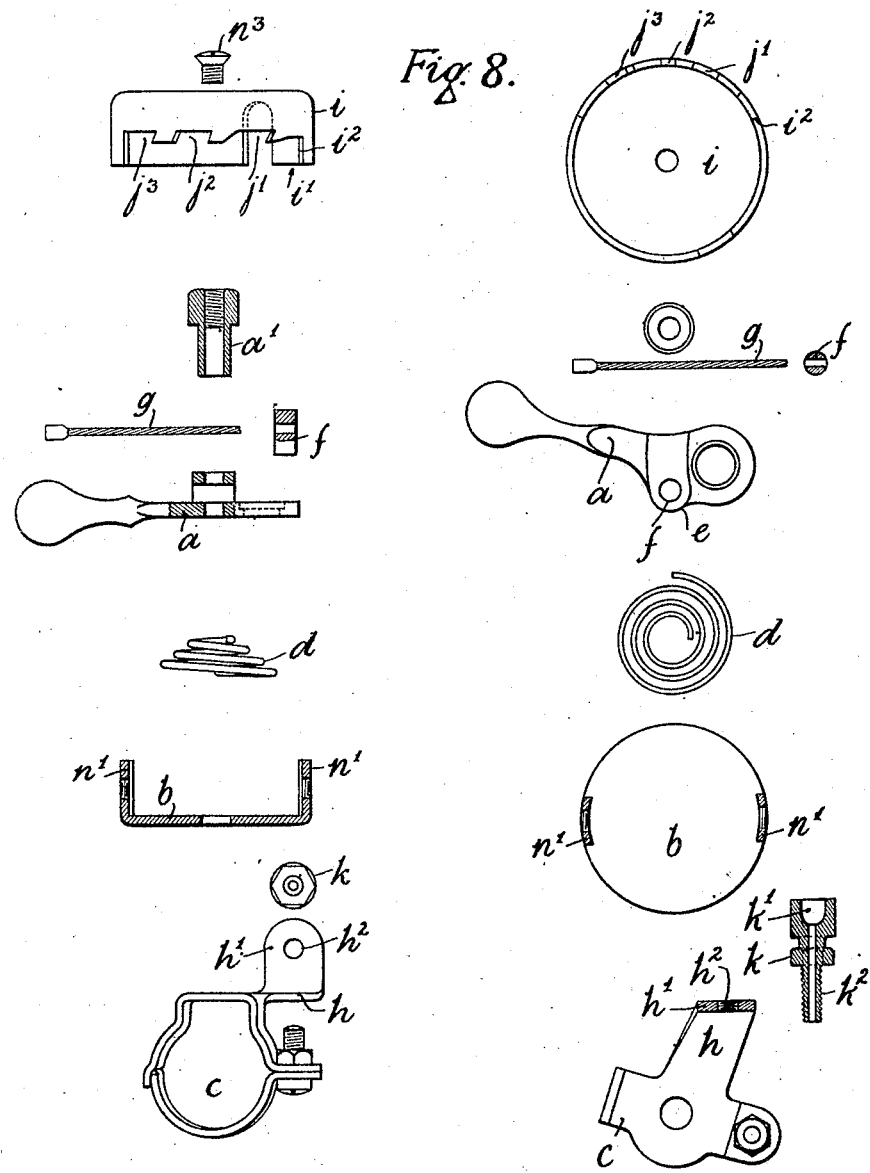

CHARLES T. B. SANGSTER, OF BOURNBROOK, NEAR BIRMINGHAM, ENGLAND.

CONTROLLING DEVICE FOR VARIABLE-SPEED MECHANISMS.

No. 865,805.      Specification of Letters Patent.      Patented Sept. 10, 1907.

Application filed January 2, 1907. Serial No. 350,448.

*To all whom it may concern:*

Be it known that I, CHARLES THOMAS BROCK SANGSTER, a subject of the King of Great Britain, residing at Dale Road, Bournbrook, near Birmingham, England, have invented certain new and useful Improvements in Controlling Devices for Variable-Speed Mechanisms, of which the following is a specification.

This invention has reference to the control or striking mechanism for use in connection with two or three speed geared hubs and other variable gear-mechanism for cycles, and also for use with certain types of change speed coaster hubs in which a back-pedal brake device is combined with the change-speed gearing, and has for its principal object, to provide an improved form or construction of handle-bar control device which embodies means for positively securing the actuating lever in its different prescribed positions and is adapted for operating change gears which afford a range of two, three or more speeds or for use in connection with two or three speed coaster hubs of that type in which, in order to admit of the machine being wheeled backwards without applying the brake, it is necessary to place the slidable gear-changing clutch or equivalent shifting element of the speed gear in an intermediate position so as to temporarily but completely dissociate the said gear from that part of the hub which is adapted when rotated in a backward direction, to operate or put in action the said brake.

The improved handle bar control device is of that type in which motion is transmitted from the actuating lever to the shiftable element of the change-speed gear through a "Bowden" wire mechanism, and it comprises a fulcrum plate for the said lever, means of attaching the fulcrum plate to a handle bar or other part of a cycle, a cover plate provided with a quadrant slot for limiting the angular movement of the lever, a set of notches adapted to be engaged by the said lever for locking the latter in one or other of certain prescribed positions and a spring for retaining the lever in such locking engagement, the whole constituting a simple and effective device which can be produced at a low cost and easily applied to any existing machine and adapted for the purpose of controlling the particular type of change-gear or combined change gear and coaster hub-mechanism with which the said machine is fitted.

Figure 1 of the accompanying drawings is a perspective view showing the manner in which the control device is applied to the handle-bar of a bicycle. Fig. 2 represents, upon an enlarged scale, a plan of the said device, which, in this particular form, is adapted to temporarily lock or secure the lever in one or other of four positions, one of which is represented in the said figure by full lines, while the other three are shown by dotted lines. Fig. 3 is an elevation of the device, showing the quadrant slot and the arrangement of the lever-locking notches. Figs. 4 and 5 show two horizontal sections of the attachment, and respectively represent the operating lever in its two extreme positions. These figures also show the manner in which the cable member of the Bowden mechanism is connected with the said lever. Fig. 6 is an elevation similar to Fig. 3, but part of the slotted and notched cover plate is broken away to show the mounting of the lever. Fig. 7 is a view in which the whole of the cover plate and the base of the attachment are shown in section but the lever, with its pivot and cable connection are in elevation. Fig. 8 shows different views of the several component parts of the attachment separated or disassembled from one another.

The same letters of reference indicate corresponding parts in the several figures of the drawings.

In the arrangement shown in these figures, $a$ is the operating lever, which is fulcrumed at $a^1$ to the center of a base-plate $b$, carried by a clip $c$, or other means for attaching the device to a cycle handle-bar or the like. This fulcrum pin $a^1$, is preferably a fixture to the base-plate, and the lever itself is mounted thereon in such a manner that, in addition to its angular movement, it is also capable of a sliding movement or play upon the said pin, and a coiled or other spring $d$, is fitted below the said lever so that its thrust or effort tends constantly to force the same up the fulcrum-pin or away from the fulcrum or base-plate and towards the termination or outer end of the fulcrum pin, but the lever may also be moved down the pin or towards the base-plate to thereby compress the spring.

One side of the lever carries or is formed with an extension piece $e$, whose outer end carries a pivotally or swively connected pin or post $f$, to which the one extremity of the inextensible cable or transmission member $g$, of a Bowden wire mechanism is secured, while extending from the edge of the fulcrum plate and at a point beyond the lever center is a rigid arm $h$, terminating in a guide piece $h^1$, which has an eye or hole $h^2$, where-through the said cable is passed and is adapted to insure that the pull of the cable against the lever shall always be applied from a point which is eccentric to, but has a fixed relationship to the lever fulcrum, and is exerted in a direction that will constantly tend to draw the said lever against a suitable stop which serves to limit its movement in the one direction and to define its normal position. The stop, and also the locking notches for securing the lever in its intermediate positions in opposition to the pull applied through the cable, are provided by securing a circular cap or cover $i$, to the front of the fulcrum plate so that it will inclose the inner end of the lever, the lateral extension piece thereof and the connection with the cable, and by forming in the side of the said cover a slot or clearance $i^1$, where-through the lever extends. The one end $i^2$, of this slot serves as the stop against which the lever is drawn by the pull of the cable while the intermediate locking notches $j^1$, $j^2$, $j^3$, are formed in the outer edge of the said slot at suitable distances apart and on the lever being pushed forward from the stop end of the slot and brought opposite to one or other of the said notches, the thrust or expanding effort of the spring against the back or underside of the said lever pushes the latter into engagement with such notch and preserves it there until hand pressure is applied for forcing the lever clear of the notch in opposition to the spring thrust, when it is free to be either moved forward by hand into a fresh position or drawn back into its normal position against the stop $i^2$, by the pull of the cable.

The guide extension piece may either be made in a piece with the fulcrum plate, or it may (as shown in the drawings) be formed out of the same blank of metal as one of the sections of the attachment clip, and it has attached to it a hollow stud or sleeve $k$, wherethrough the cable of the transmission mechanism passes, and whose outer end is counterbored to form a socket and stop $k^1$, for the reception of the one extremity of the incompressible tubular member M, of the said transmission mechanism, the stop for the other end being formed in a separate stud $n$, (see Fig. 1) which is adapted to be clamped or clipped to any suitable part of the framing of a machine.

The shank $k^2$ of the hollow stud $k$, on the guide piece may be arranged to extend through a suitable opening in the side into the interior of the cover or cap of the attachment and the said cover may be rigidly secured to the fulcrum plate by providing, at the edges of the latter, upstanding or projecting ears or lugs $n'$, $n^1$, which fit closely into the inside of the front cover and are secured there by screws $n^2$, passed through coincident holes in the two parts. A further connection may be made by passing a screw $n^3$, through the center of the cover into a tapped hole in the crown or outer end of the fixed fulcrum pin.

With such an arrangement as above described, the lever is maintained in its normal position, as shown in Fig. 3, by the direct pull of the cable and the disposition of the eccentric cable-guide relative to the stop $i^2$, and the lever fulcrum is such that, with the lever in the said position, the pull is exerted in a direct line from the said guide to the point where the cable is attached to the lever, i. e., at an intermediate point between the fulcrum and the part which traverses within the slot $i$, while when said lever is engaged and retained, by the thrust of the locking spring, in either one or other of the notches $j^1$, $j^2$, $j^3$, the pull of the cable draws the lever against the rear edge of the notch which is nearest the stop end of the slot, and by making this side slightly undercut, as shown, to receive the edge of the lever, a more effective interlocking action is obtained and the lever is more positively held in the selected position. Any number of notches may be formed in the edge of the slot, according to the number of positions in which the lever has to be secured.

Having fully described my invention what I desire to claim and secure by Letters Patent is:—

1. A controlling device for variable speed mechanisms comprising a fixed cover plate provided with a series of notches, a spindle, an angularly adjustable operating lever slidably mounted upon said spindle, whereby the lever can be shifted to engage in the notches to lock it and removed from the notches to release it, and a spring engaging said lever for automatically shifting it in one direction to retain it in one of said notches.

2. A controlling device for variable speed mechanisms comprising a fixed cover plate with a series of notches, a spindle, an angularly adjustable operating lever slidably mounted upon said spindle, whereby the lever can be shifted to engage in the notches to lock it and removed from the notches to release it, a spring engaging said lever for automatically shifting it in one direction to retain it in one of said notches, there being a stop on said cover plate corresponding to the prescribed normal position of the lever, a fixed guide arranged eccentrically with respect to said spindle, and a flexible member connected to the lever at a point intermediate the fulcrum and handle thereof and directed through said guide, the pull of said cable retaining the lever against one wall of that notch in which the lever engages.

3. A control device for variable speed mechanisms comprising a base plate, an operating lever fulcrumed thereon, a cover plate carried by the base plate and embodying a quadrant-shaped slot in which the lever moves, there being a stop on said cover plate for determining the normal position of the lever, and a plurality of notches each of which is adapted to receive the lever thereby locking it, an influencing spring for the lever, and a flexible member attached to the lever.

4. A control device for variable speed mechanisms comprising a base plate, an operating lever fulcrumed thereon, a cover plate carried by the base plate and embodying a quadrant-shaped slot in which the lever moves, there being a stop on said cover plate for determining the normal position of the lever and a plurality of notches each of which is adapted to receive the lever thereby locking it, an influencing spring for the lever, and a flexible member attached to the lever at a point intermediate the fulcrum and handle part thereof.

5. A control device for variable speed mechanisms comprising a base plate, an operating lever fulcrumed thereon, a cover plate carried by the base plate and embodying a quadrant-shaped slot in which the lever moves, there being a stop on said cover plate for determining the normal position of the lever and a plurality of notches each of which is adapted to receive the lever thereby locking it, an influencing spring for the lever, a guide arranged eccentrically with respect to the fulcrum of the lever, and a flexible member directed through said guide and attached to the lever at a point intermediate its fulcrum and the handle thereof.

In testimony whereof I have hereunto set my hand in presence of two subscribing witnesses.

CHARLES T. B. SANGSTER.

Witnesses:
 FRANK S. SIMMOND,
 ARTHUR SADLER.